(12) United States Patent
Faibish et al.

(10) Patent No.: US 11,847,558 B2
(45) Date of Patent: Dec. 19, 2023

(54) ANALYZING STORAGE SYSTEMS USING MACHINE LEARNING SYSTEMS

(71) Applicant: EMC IP HOLDING COMPANY LLC, Hopkinton, MA (US)

(72) Inventors: Sorin Faibish, Newton, MA (US);
Philippe Armangau, Acton, MA (US);
James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1444 days.

(21) Appl. No.: 15/971,171

(22) Filed: May 4, 2018

(65) Prior Publication Data
US 2019/0340459 A1 Nov. 7, 2019

(51) Int. Cl.
| | |
|---|---|
| G06N 3/08 | (2023.01) |
| G06F 3/06 | (2006.01) |
| G06N 5/04 | (2023.01) |
| G06T 7/13 | (2017.01) |
| G06N 20/00 | (2019.01) |
| G06V 10/82 | (2022.01) |
| G06N 5/046 | (2023.01) |

(52) U.S. Cl.
CPC .............. *G06N 3/08* (2013.01); *G06F 3/0653* (2013.01); *G06N 5/046* (2013.01); *G06N 20/00* (2019.01); *G06T 7/13* (2017.01); *G06V 10/82* (2022.01)

(58) Field of Classification Search
CPC ................................ G06N 20/00; G06N 5/046
See application file for complete search history.

(56) References Cited

U.S. PATENT DOCUMENTS

| | | | | |
|---|---|---|---|---|
| 9,805,288 | B2* | 10/2017 | Kaasila | ................... G06T 11/60 |
| 10,375,098 | B2* | 8/2019 | Oliner | ................. H04L 63/1425 |
| 10,936,899 | B2* | 3/2021 | Moloney | .............. G06V 10/764 |
| 2015/0146236 | A1* | 5/2015 | Enomoto | ........... H04N 1/00777 |
| | | | | 358/1.14 |
| 2019/0089371 | A1* | 3/2019 | Ozaki | ................. G06F 11/3082 |

OTHER PUBLICATIONS

Krisada Sirivathanant, "Non-destructive Detecting Micro-Cracks and Crack Patterns in the Memory Device by using Memory Tester's Bitmapping Analysis", IEEE, 2007 (Year: 2007).*
Sorin Faibish, "Storage Virtualization using a Block-device File system", Jan. 1, 2008 (Year: 2008).*
Xianmin Wei, "Research of Neural Networks in Image Anomaly Identification Application", IEEE, 2011 (Year: 2011).*

* cited by examiner

*Primary Examiner* — Ann J Lo
*Assistant Examiner* — Van C Mang
(74) *Attorney, Agent, or Firm* — Krishnendu Gupta; Lesley Leonessa

(57) ABSTRACT

A method is used in analyzing a storage system using a machine learning system. Data gathered from information associated with operations performed in a storage system is analyzed. The storage system is comprised of a plurality of components. A bitmap image is created based on the gathered data, where at least one of the plurality of components is represented in the bitmap image. The machine learning system is trained using the bitmap image, where the bitmap image is organized to depict the plurality of components of the storage system.

20 Claims, 9 Drawing Sheets

ANALYZING STORAGE SYSTEMS USING MACHINE LEARNING SYSTEMS

BACKGROUND

Technical Field

This application relates to analyzing storage systems using machine learning systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system Input/Output (I/O) operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the back-end and front end communication medium. The host systems do not address the disk drives of the storage device directly, but rather, access what appears to the host systems as a plurality of logical disk units, logical devices, or logical volumes. The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies. The physical devices of a data storage system, such as a data storage array (or "storage array"), may be used to store data for multiple applications.

Data storage systems are arrangements of hardware and software that typically include multiple storage processors coupled to arrays of non-volatile storage devices, such as magnetic disk drives, electronic flash drives, and/or optical drives. The storage processors service I/O operations that arrive from host machines. The received I/O operations specify storage objects that are to be written, read, created, or deleted. The storage processors run software that manages incoming I/O operations and performs various data processing tasks to organize and secure the host data stored on the non-volatile storage devices.

SUMMARY OF THE INVENTION

In accordance with one aspect of the invention is a method used in analyzing a storage system using a machine learning system. The method analyzes data gathered from information associated with operations performed in a storage system, where the storage system is comprised of a plurality of components. The method creates a bitmap image based on the gathered data, where at least one of the plurality of components is represented in the bitmap image. The method trains a machine learning system using the bitmap image, where the bitmap image is organized to depict the plurality of components of the storage system.

In accordance with another aspect of the invention is a system used in analyzing a storage system. The system analyzes data gathered from information associated with operations performed in a storage system, where the storage system is comprised of a plurality of components. The system creates a bitmap image based on the gathered data, where at least one of the plurality of components is represented in the bitmap image. The system trains a machine learning system using the bitmap image, where the bitmap image is organized to depict the plurality of components of the storage system.

In accordance with another aspect of the invention, a computer program product comprising a computer readable medium is encoded with computer executable program code. The code enables execution across one or more processors for analyzing a storage system. The code analyzes data gathered from information associated with operations performed in a storage system, where the storage system is comprised of a plurality of components. The code creates a bitmap image based on the gathered data, where at least one of the plurality of components is represented in the bitmap image. The code trains a machine learning system using the bitmap image, where the bitmap image is organized to depict the plurality of components of the storage system.

In accordance with one aspect of the invention is a method used in analyzing a storage system. The method analyzes data gathered from information associated with operations performed in a storage system, where the storage system is comprised of a plurality of components. The data is gathered from a cloud based management application. The method creates a bitmap image based on the gathered data, where at least one of the plurality of components is represented in the bitmap image. The method trains a machine learning system to analyze, in a cloud based environment, the bitmap image to detect the difference between occurrence of at least one of malfunctions in the storage system and normal functioning of the storage system.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
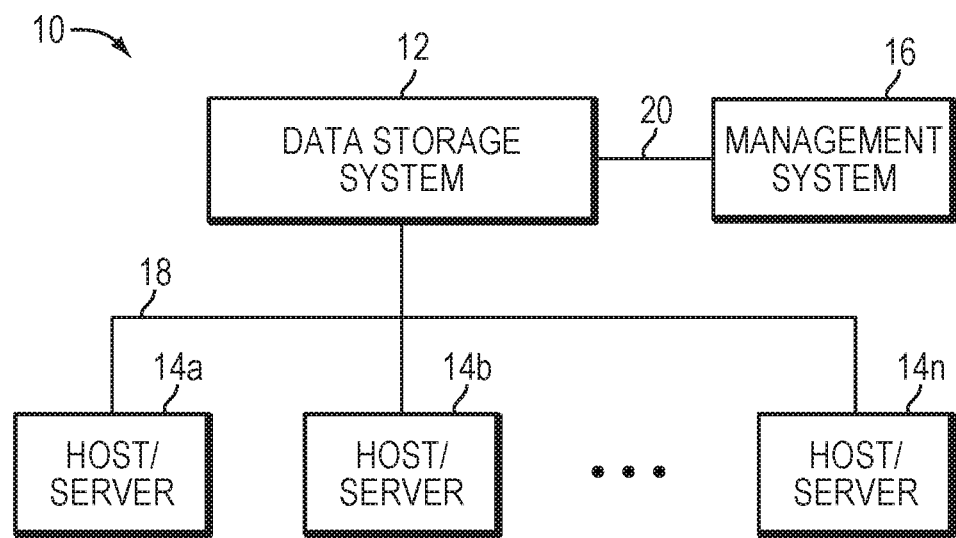
FIG. 1 an example of an embodiment of a computer system, in accordance with an embodiment of the present disclosure.

Described below is a technique for use in analyzing a storage system using a machine learning system, which technique may be used to provide, among other things, analyzing data gathered from information associated with operations performed in a storage system, where the storage system is comprised of a plurality of components, creating a bitmap image based on the gathered data, where at least one of the plurality of components is represented in the bitmap image, and training the machine learning system using the bitmap image, where the bitmap image is organized to depict the plurality of components of the storage system.

As described herein, in at least one embodiment of the current technique logs and statistics are gathered from a storage system. A bitmap image is created from the logs representing the components in the storage system. A machine learning system is trained using the bitmap image as input. The output of the machine learning system is a graphical depiction of the components in the storage system represented as bitmap objects. A health assessment of each component is also depicted. For example, a component may be graphically depicted as a blue image when that component is functioning correctly, but may be graphically depicted as red when that component is functioning incorrectly.

In a conventional system, it is difficult or impossible to quickly detect a malfunction in a storage array when the malfunction occurs in the storage array thereby causing the storage array to become degraded in performance or result in an error. Generally, a user of a storage system expects a timely detection of a malfunction in a storage system and expects an ability to find a solution to the cause of the malfunction before the user has to call a storage vendor for providing support to address the malfunction. Consequently, storage vendors need to maintain a large number of customer support engineers to respond timely to customer complaints. Generally, data such as logs and statistical information is gathered from all the components and modules of a storage array including but not limited to hardware and software components. Thus, for example, when a malfunction is detected in a software module of a storage array, additional data such as statistical information is gathered. As a result, there is a large amount of statistical data that is collected and stored for a storage system. Conventional technologies may collect, for example, 4-5 GB of statistics and data logs per day for a storage system. Thus, in such a conventional system, it is difficult or impossible to analyze such a significant amount of data gathered in a storage system and determine what went wrong and what part of the storage system is malfunctioning and it can take a long time to analyze the data and logs and determine which component of the storage system is at fault. Thus, in such a conventional system, it requires maintaining a large staff of customer support engineers to respond quickly to customer complaints related to storage system malfunctions. Conventional technologies may require the staff of customer support engineers to spend days scanning all the logs to detect the source of the errors and faulty behavior of the storage system. In such a conventional system, such analysis of data and logs is performed manually, by inspecting the statistics and logs searching for errors. Conventional technologies do not have an automated way to quickly identify a hardware and/or software problems in a storage system. While a customer may observe the data such as statistics and logs collected by a cloud based application, the customer cannot decipher such data and determine the source or cause of a malfunction in a storage system, even if the customer observes a change in the behavior of the storage system. For example, the customer may not be able to determine if a change in the behavior of a storage system is due to a malfunction, or due to a change in an application workload. Even the customer's Information Technology (IT) personnel and/or the vendor of the application might not be aware of the changes that a particular application may have on the Input/Output (IO) behavior of the storage array. Thus, even if IT personnel or the customer observes a change in behavior of the storage system, neither can determine if there is a fault in the hardware, for example, a failure of the disk, network, Fibre Channel port or Serial Attached Small Computer System Interface (SCSI) port. These types of failures degrade the performance of the storage system, and result in a change in behavior of the storage system. It is critical to determine the difference between simply workload changes, and actual hardware or software errors, and to determine whether and when to involve customer service engineering to locate and rectify any faulty behavior, with the least amount of disruption to the storage system.

Conventional technologies do not provide an automated mechanism that continuously monitors the storage system to detect changes that are a result of faulty components quickly enough to notify the customer service engineers to fix the faulty components. Further, in such a conventional system, manual inspection of data in log files take a large amount of time as the data stored in such logs can be significant in size and unstructured in format thereby making interpretation of such data significantly difficult. Conventional technologies of manually inspecting logs and statistics do not provide for learning from previous cases of malfunctions, other than to teach customer services engineers to look for certain storage system behaviors. This is particularly difficult when certain malfunctions may only occur once or twice during the life of a product. However, there may be hundreds of these types of malfunctions that only occur once or twice over the life of the product. Thus, conventional technologies require human intervention to decipher logs and statistics, and conventional technologies do not provide a way to share this acquired knowledge among the customer service engineers.

Conventional technologies do not organize the data collected by logs in a form that can be analyzed and interpreted quickly and easily to determine the faulty component(s). Conventional technologies cannot determine which components are faulty and also why the faulty components are failing. Conventional technologies cannot provide the level of detail necessary to determine the location of a faulty component and the level of severity associated with the malfunction.

By contrast, in at least some implementations in accordance with the current technique as described herein, a method analyzes data gathered from information associated with operations performed in a storage system, where the storage system is comprised of a plurality of components. The method creates a bitmap image based on the gathered data, where at least one of the plurality of components is represented in the bitmap image. The method trains a machine learning system using the bitmap image, where the bitmap image is organized to depict the plurality of components of the storage system.

Thus, in at least one embodiment of the current technique, the goal of the current technique is to identify malfunctions within a storage system, identify a location within the storage system associated with the malfunction, as well as to provide details associated with the severity of the malfunction. Another goal of the current technique is to quickly provide this information in a visual representation that intuitively informs a viewer which components are faulty, where in the component the malfunction occurred, and the severity of the malfunction. Additionally, the current technique provides a health assessment of components in the storage system by visually representing each component, along with an indication as to whether each component is functioning or malfunctioning.

In at least some implementations in accordance with the current technique described herein, the use of analyzing a storage system using a machine learning system technique can provide one or more of the following advantages: discerning between changes in an application workload versus a hardware and/or software malfunction, drastically reducing the time required to detect and resolve malfunctions that occur in a storage system, incorporating previously detected malfunctions into reach new release of hardware or software components of a storage system, facilitating sharing of acquired knowledge among customer service engineers, eliminating the need to interpret logs to identify malfunctions, providing a visual representation of the components in a storage system along with an indication of the health status associated with each component, identifying malfunctions within components, identifying the location of the malfunctions, and identifying a severity associated with the malfunction.

In contrast to conventional technologies, in at least some implementations in accordance with the current technique as described herein, a method analyzes data gathered from information associated with operations performed in a storage system, where the storage system is comprised of a plurality of components. The method creates a bitmap image based on the gathered data, where at least one of the plurality of components is represented in the bitmap image. The method trains a machine learning system using the bitmap image, where the bitmap image is organized to depict the plurality of components of the storage system.

In an example embodiment of the current technique, the machine learning system detects a malfunction attributed to at least one component of the plurality of components depicted in the bitmap image by analyzing the bitmap image.

In an example embodiment of the current technique, the method detects a change between the bitmap image and a second bitmap image created from a different set of data.

In an example embodiment of the current technique, the method modifies a representation of at least one component of the plurality of components in a graphical user interface to indicate the detected malfunction.

In an example embodiment of the current technique, the information associated with the operations performed in the storage system includes at least one of event logs and statistics gathered from the plurality of components of the storage system upon detection of a malfunction in at least one component of the plurality of components.

In an example embodiment of the current technique, the data gathered from information associated with operations performed in the storage system is gathered by using a cloud based management application.

In an example embodiment of the current technique, when the method creates the bitmap image based on the gathered data further, the method depicts each component of the plurality of components as a bitmap object in the bitmap image, where each bitmap object has a different shape and is associated with a different sized pixel based on an importance associated with the each component in the storage system.

In an example embodiment of the current technique, when the method trains the machine learning system using the bitmap image, the method trains the machine learning system to detect at least one of an object shape, an object edge, a plurality of pixels, a color associated with at least one pixel in the bitmap image, and at least one interaction between the plurality of components in the storage system.

In an example embodiment of the current technique, when the method trains the machine learning system using the bitmap image, the method trains the machine learning system to analyze the bitmap image to detect the difference between occurrence of at least one of malfunctions in the storage system and normal functioning of the storage system.

In an example embodiment of the current technique, the method analyzes data gathered from information associated with operations performed in a storage system, where the storage system is comprised of a plurality of components, and where the data is gathered from a cloud based management application. The method creates a bitmap image based on the gathered data, where at least one of the plurality of components is represented in the bitmap image. The method trains a machine learning system to analyze, in a cloud based environment, the bitmap image to detect the difference between occurrence of at least one of malfunctions in the storage system and normal functioning of the storage system.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through Fibre Channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a connection switch or other switching equipment that may exist such as a phone line, a repeater, a multiplexer or even a satellite. In at least one embodiment, the hosts may communicate with the data storage systems over an iSCSI or Fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an SATA disk drive, FC disk drive, and the like. Thus, the storage system may be made up of physical devices with different physical and performance characteristics (e.g., types of physical devices, disk speed such as in RPMs), Redundant Array of Independent. Disks (RAID) levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
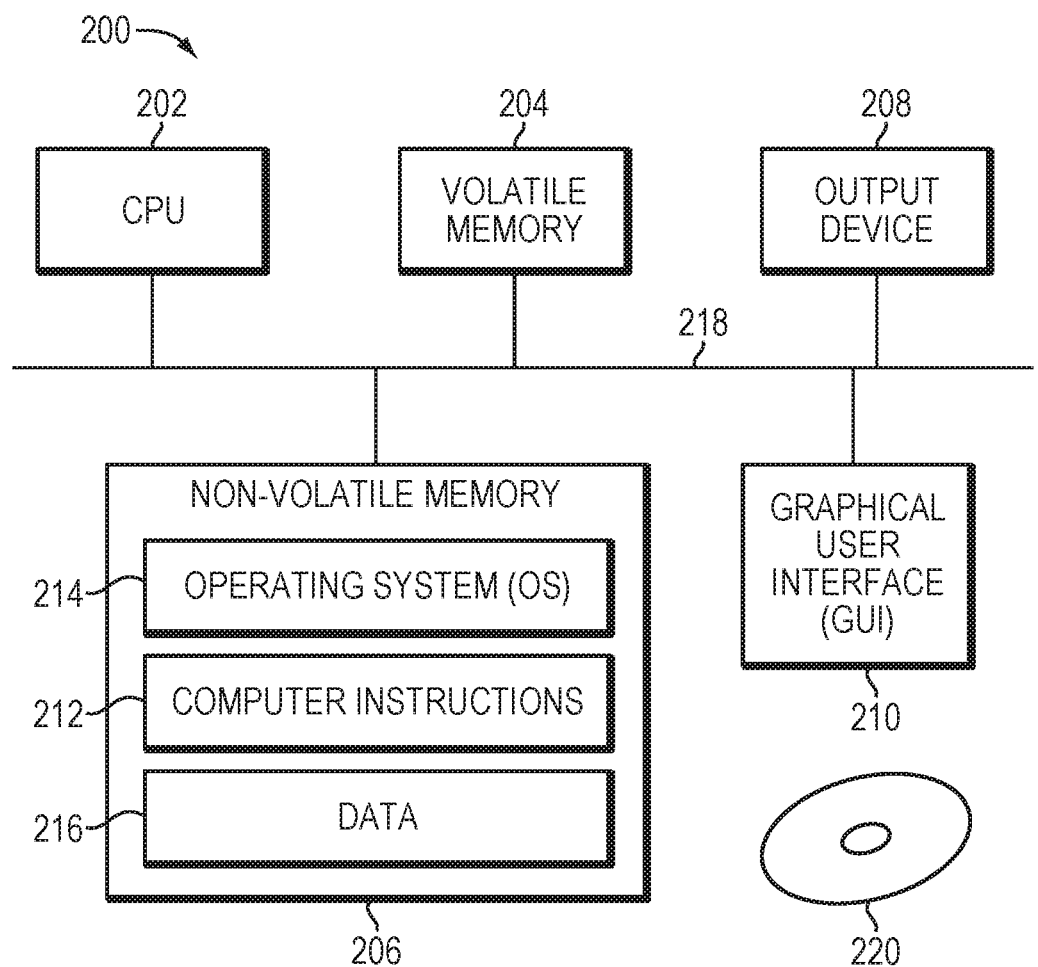
FIG. 2 is a block diagram of a computer, in accordance with an embodiment of the present disclosure.

FIG. 2 illustrates a block diagram of a computer 200 that can perform at least part of the processing described herein, according to one embodiment. The computer 200 may include a processor 202, a volatile memory 204, a non-volatile memory 206 (e.g., hard disk), an output device 208 and a graphical user interface (GUI) 210 (e.g., a mouse, a keyboard, a display, for example), each of which is coupled together by a bus 218. The non-volatile memory 206 may be configured to store computer instructions 212, an operating system 214, and data 216. In one example, the computer instructions 212 are executed by the processor 202 out of volatile memory 204. In one embodiment, an article 220 comprises non-transitory computer-readable instructions. In some embodiments, the computer 200 corresponds to a virtual machine (VM). In other embodiments, the computer 200 corresponds to a physical computer.

Figure 3:
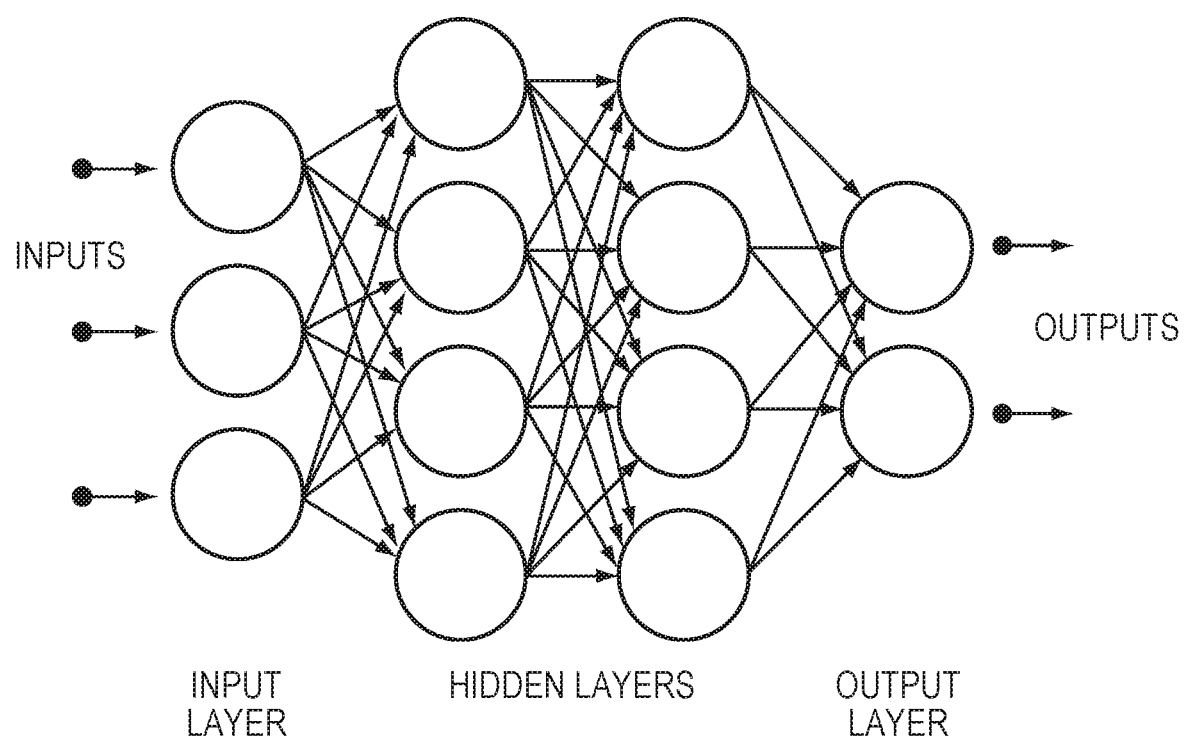
FIG. 3 illustrates an example process to train a multi-layer neural network

FIG. 3 illustrates an example process to train a multi-layer neural network. In a storage system, multiple levels of logs and statistics may be collected from different components or modules (such as hardware or software) in a storage system. Each of the multiple levels of logs detect malfunctions of different modules in different software layers of the storage systems. This data may be used to manually train a machine learning system, such as a Neural Network, as illustrated in FIG. 3, The input data, however, is very unstructured and cannot be easily organized to train the Neural Network without human interpretation of the input (i.e., the logs and statistics), and the resulting output.

Figure 4:
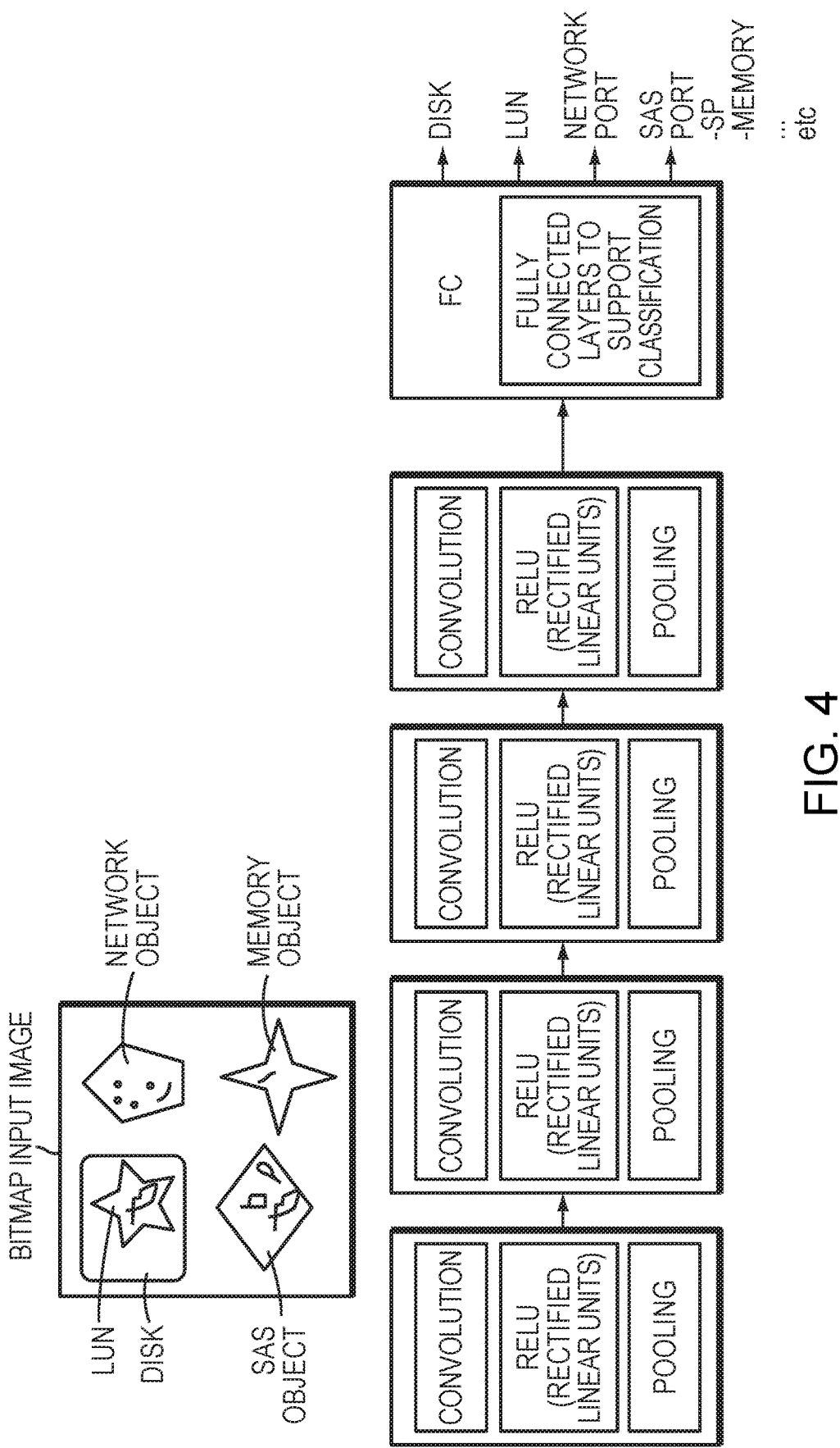
FIG. 4 illustrates creating a bitmap image from data from the logs and statistics collected by the storage system, in accordance with an embodiment of the present disclosure.

FIG. 4 illustrates creating a bitmap image from data from the logs and statistics collected by the storage system, in accordance with an embodiment of the present disclosure. In an example embodiment, the method transforms the data from the logs and statistics collected by the storage system, and organizes the data as a bitmap image, as illustrated in FIG. 4. The bitmap image may be used as input to the machine learning system for training and detecting malfunctions by detecting different bitmap objects in the bitmap (i.e., Disk, LUN, Network Port, SAS Port, SP, Memory, etc.). In an example embodiment, the machine learning system may use a neural network, such as a Convolutional Neural Network (CNN) that accepts images as input. The CNN preprocesses the images prior to their input into the machine learning system. In an example embodiment, the preprocessing comprises analyzing the logs and statistics, determining which components malfunctioned, and generating a bitmap image representing any faulty components.

The method transforms the data from the logs and statistics to create a bitmap image that is used as input to the machine learning system. In an example embodiment, the bitmap is created such that each module of the software in the storage array is mapped as a specific bitmap object in the bitmap image. The method detects when the bitmap objects within the bitmap image change over time, for example, when a malfunction occurs within a software module in the storage system. The bitmap is created such that each component in the storage system is represented by different shapes of objects in the bitmap with different sizes of pixels. In an example embodiment, the different sizes of pixels correspond to the importance of the module/component in the health of the entire storage system. For example the bitmap of the disk subsystem can use single pixel for each disk failure and double pixel for each RAID-5 LUN. As illustrated in FIG. 4, the bitmap image is created as a flowchart compute box, with the LUNs created as star shapes inside the compute box.

Figure 5:
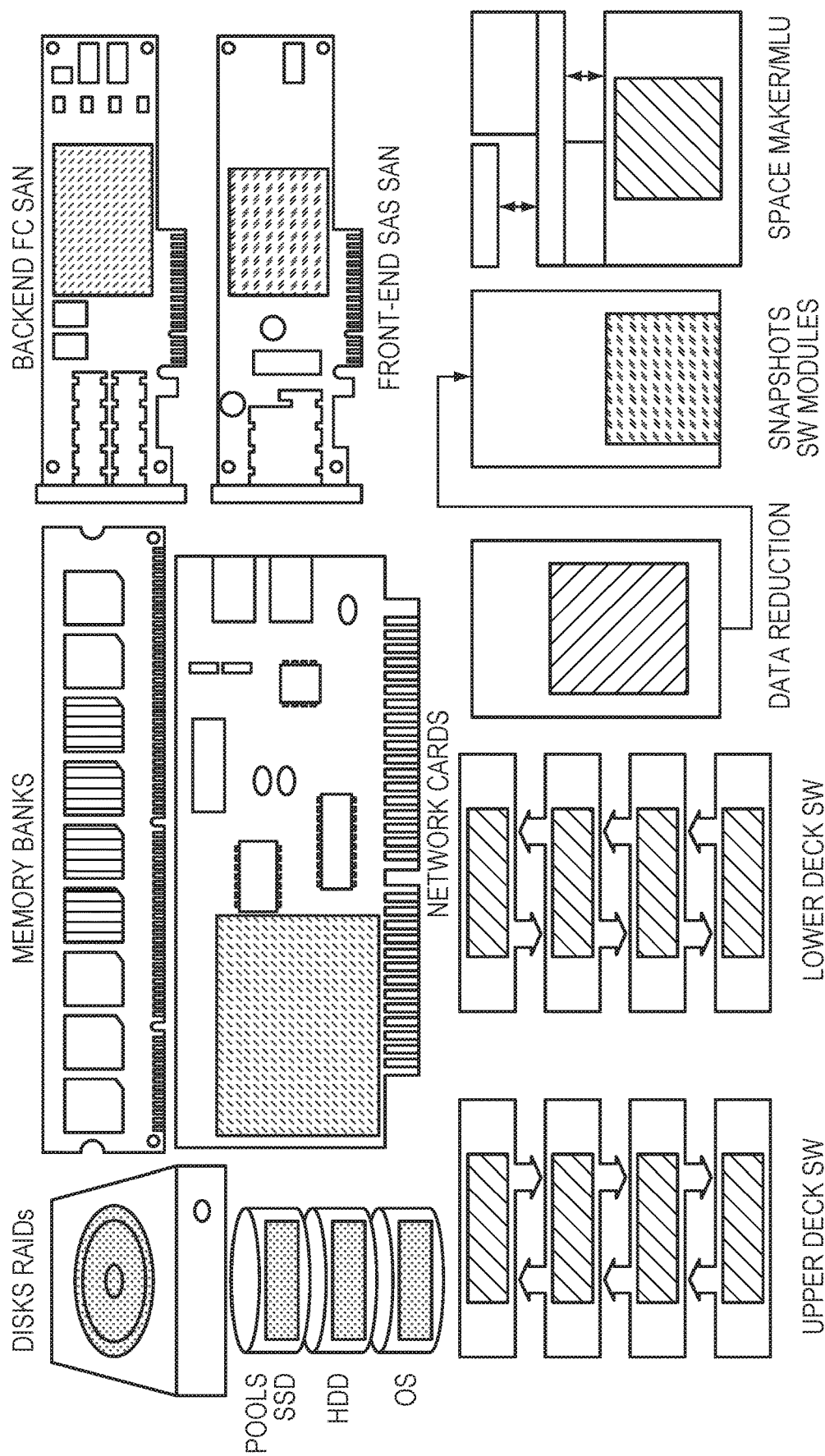
FIG. 5 illustrates a bitmap objects of a healthy storage system, in accordance with an embodiment of the present disclosure.

FIG. 5 illustrates bitmap objects of a healthy storage system, in accordance with an embodiment of the present disclosure. In an example embodiment, components in the storage system are represented within a graphical user interface as bitmap objects. The bitmap objects may be rendered as a particular color to indicate a particular component, or may be rendered as a particular shape. The visual representation of the components within the storage system make it easy and intuitive to assess the health of the storage system. FIG. 5 illustrates a "healthy" storage system, meaning no malfunctions have been detected.

Figure 6:
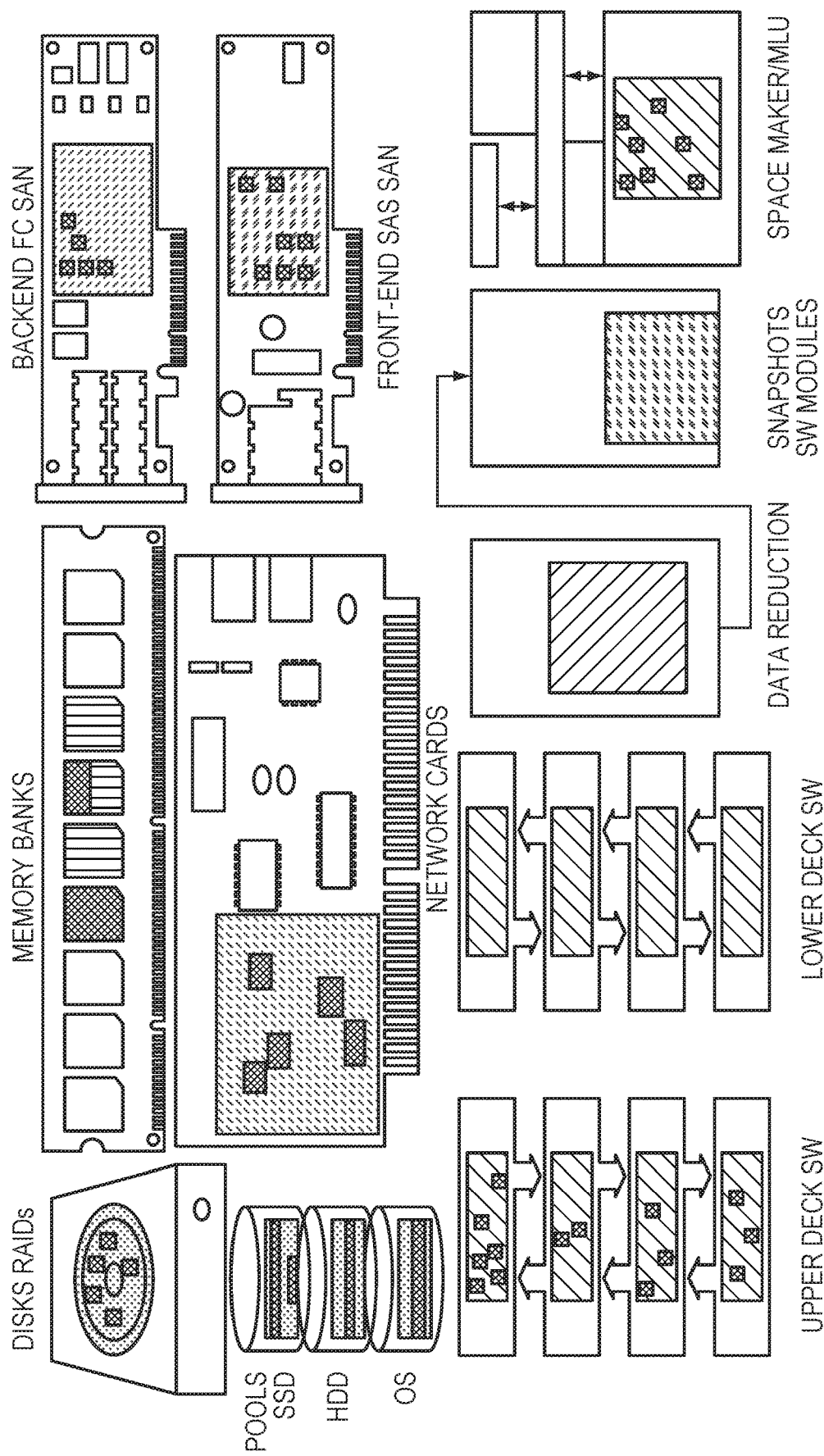
FIG. 6 illustrates a bitmap objects of a faulty storage system, in accordance with an embodiment of the present disclosure.

FIG. 6 illustrates bitmap objects of a faulty storage system, in accordance with an embodiment of the present disclosure. For example, the "Disks Raids" depicted as "healthy" in FIG. 5, are depicted as "unhealthy" in FIG. 6, with red colored components in the depicted "Disks Raids" image. In an example embodiment, faulty components may be depicted with a color that represents a malfunction, and the shade of that color may change (or a different color may be used) depending on a threshold associated with the malfunction. In an example embodiment, the method distinguishes between the different colors and the different shades of colors to identify malfunctions and/or levels of malfunctions. In another example embodiment, shapes may be used to represent faulty versus functioning components. It should be noted that any type of visual representation may be used to indicate a difference between functioning and faulty components.

Figure 7:
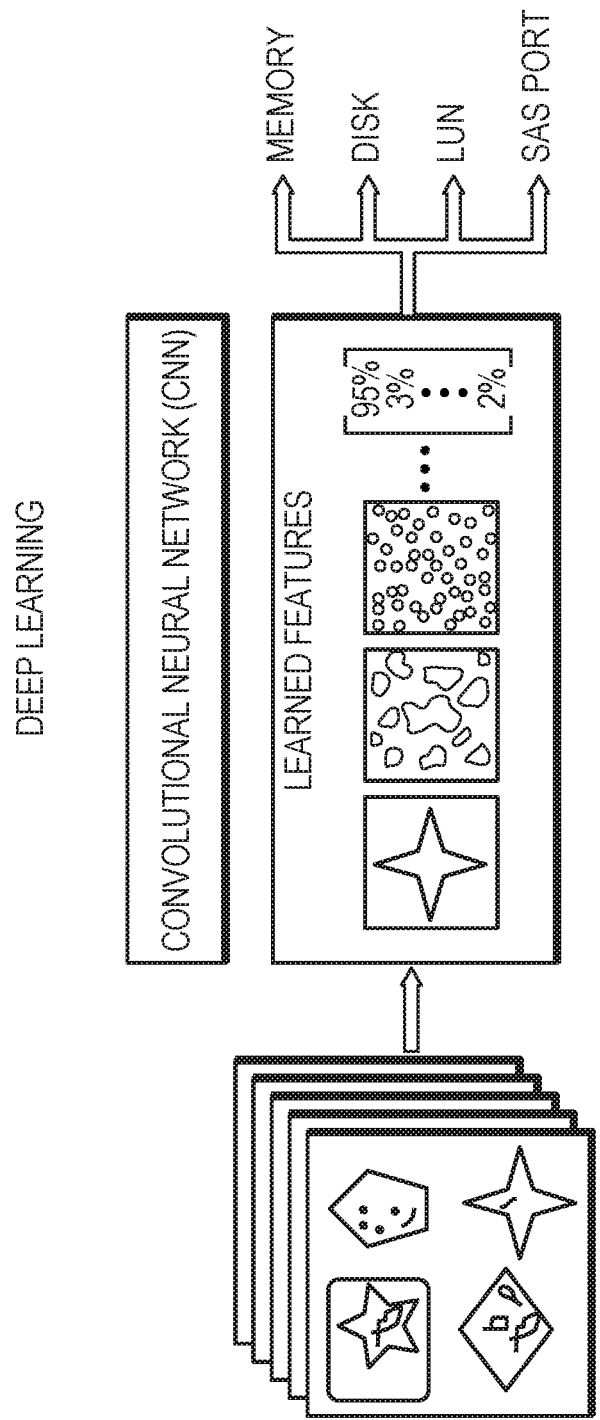
FIG. 7 illustrates a deep learning Convolutional Neural Network configuration approach to training the machine learning system using the bitmap image, in accordance with an embodiment of the present disclosure.

FIG. 7 illustrates a deep learning Convolutional Neural Network configuration approach to training the machine learning system using the bitmap image, in accordance with an embodiment of the present disclosure. In an example embodiment, the machine learning system is trained within a cloud based environment, allowing the machine learning system to train on large amounts of data gathered from multiple customers, where the large amounts of data comprise at least a few thousand types of malfunctions. In the example illustrated in FIG. 7, a plurality of bitmap images are used as input to train a Convolution Neural Network, and the output is a graphical user interface depicting a health assessment of a storage system. The output may be, for example, as illustrated in FIG. 5 and FIG. 6. In another example embodiment, the machine learning system executes within a cloud based environment.

Figure 8:
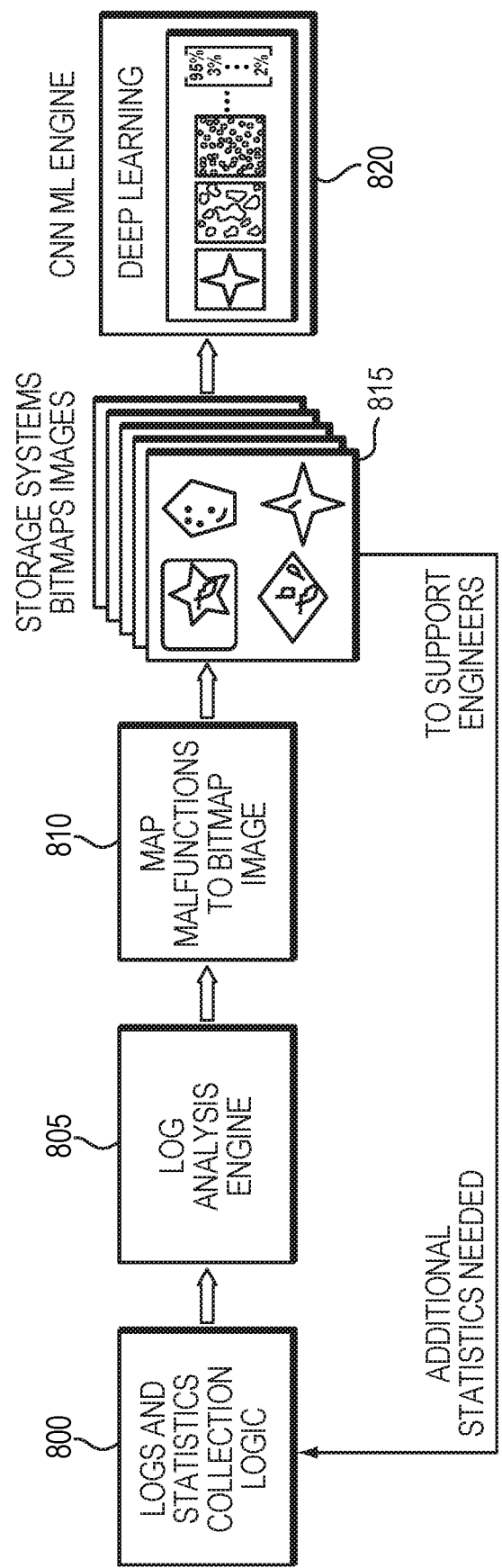
FIG. 8 illustrates mapping the text messages in the event logs to a bitmap image, in accordance with an embodiment of the present disclosure.

FIG. 8 illustrates mapping the text messages in the event logs to a bitmap image, in accordance with an embodiment of the present disclosure. In an example embodiment, data such as logs and statistics are gathered in a storage system using, for example, the Logs and Statistics Collection Logic 800. For example, storage systems have advanced mechanisms for detecting malfunctions of software and hardware by collecting logs and statistics related to the operation of the storage system. In one example embodiment, the logs and statistics are collected using a cloud based management application. The method uses a Log Analysis Engine 805 to analyze the data, and map the malfunctions identified within the logs. The method creates a bitmap image, and maps the malfunctions to bitmap pixels in the bitmap image 810. The bitmap image is the result of the analysis performed on the logs and statistics. In an example embodiment, a bitmap image is created for each hardware platform, and each new release, creating multiple bitmap images 815. The bitmap image is used as input to the machine learning system, for example a Convolutional Neural Network (CNN) Machine Learning (ML) engine 820. The CNN accepts images as input. In an example embodiment, the CNN preprocesses the images prior to their input into the machine learning system. In an example embodiment, additional statistics may be provided, for example, from customer support historical data from reported malfunctions.

Figure 9:
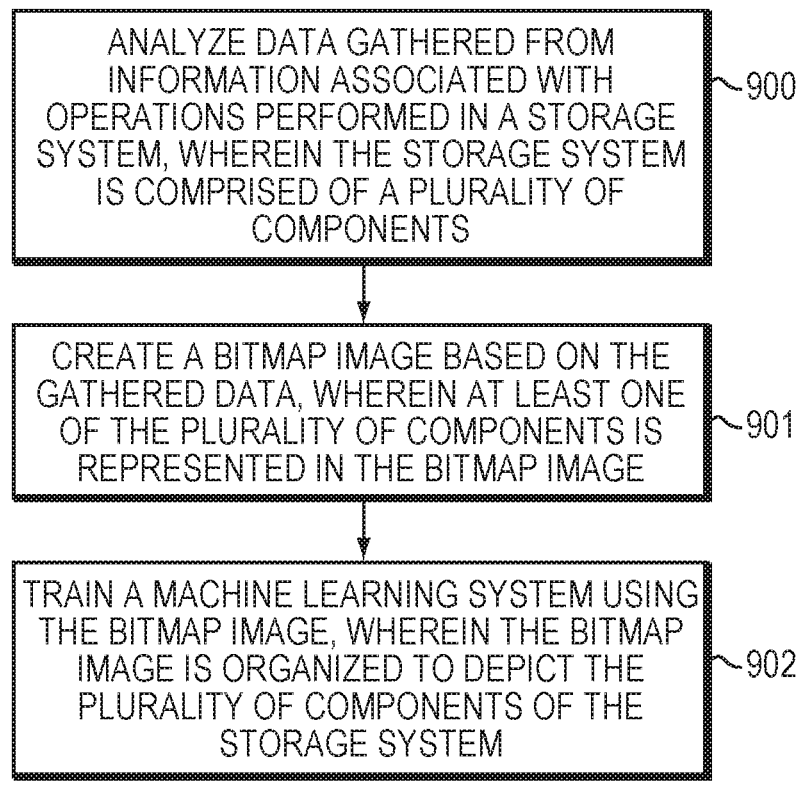
FIG. 9 is a flow diagram illustrating processes that may be used in connection with techniques disclosed herein.

Referring to FIG. 9, shown is a more detailed flow diagram illustrating analyzing a storage system using a machine learning system. With reference also to FIGS. 1-8, the method analyzes data gathered from information associated with operations performed in a storage system, where the storage system is comprised of a plurality of components (Step 900). In an example embodiment, the data gathered from information associated with operations performed in the storage system is gathered by using a cloud based management application. In another example embodiment, the information associated with the operations performed in the storage system includes at least one of event logs and statistics gathered from the plurality of components of the storage system upon detection of a malfunction in at least one component of the plurality of components. In an example embodiment, storage systems have advanced mechanisms for detecting malfunctions of software and hardware by collecting logs and statistics related to the operation of the storage system. For example, when a malfunction of a software module is detected by the storage system forensic tools, additional statistical data is collected. This results in a large amount of statistical data collected. In an example embodiment, the data is collected and stored in a cloud based environment. In an example embodiment, the method analyzes the data gathered, for example, by searching for keywords in the logs and statistics that indicate malfunctions, and/or faulty components. The method may determine the location of the malfunction, type of malfunction, value of the malfunction, severity of the malfunction, etc.

In an example embodiment, the method creates a bitmap image based on the gathered data, where at least one of the plurality of components is represented in the bitmap image (Step 901). The bitmap image is the result of the analysis on the gathered data. In essence, the bitmap image is a visualization of the health of the storage system based on gathered data, for example, the logs and statistics.

In an example embodiment, the method trains a machine learning system using the bitmap image, where the bitmap image is organized to depict the plurality of components of the storage system (Step 902). In an example embodiment, the method trains a machine learning system to analyze, in a cloud based environment, the bitmap image to detect the difference between occurrence of at least one of malfunctions in the storage system and normal functioning of the storage system. In an example embodiment, the input to the machine learning system is the bitmap image created from the logs. In an example embodiment, the machine learning system is trained using data collected from different hardware platforms, and different versions of software, as well as using customer support historical data from reported malfunctions. In an example embodiment, bitmap objects representing components in the storage system are created from the data collected during the Quality Assurance testing performed for each platform, and release. The machine learning system is trained to learn normal versus faulty behavior in the storage system. In an example embodiment, errors may be intentionally included during the Quality Assurance testing to further train the machine learning system. In an example embodiment, the output of the machine learning system are bitmap objects that represent the hardware and software components of the storage system. The bitmap objects are rendered in a graphical user interface where customer service engineers, for example, can intuitively assess the health of a storage system. In an example embodiment, customer support engineers are trained to detect malfunctions in the storage system by inspecting the bitmap objects depicted within the graphical user interface instead of manually searching through the logs and statistics to detect the source of malfunctions in the storage system.

The bitmap objects are represented according to the "health" of each component. For example, a disk can be represented as a healthy disk, or a faulty disk, depending on the depiction of the bitmap object that represents the disk. For example, a healthy disk may be represented as a purple disk object. A faulty disk may be represented as a purple disk object with red identifiers, where the red identifiers indicate detected malfunctions associated with the disk. In an example embodiment, the position of, for example, red identifiers on a component in the storage system, may indicate where, within that component the malfunction occurred. In an example embodiment, the historical data from reported malfunctions are used to train the machine learning system to associate the malfunctions detected in the information gathered with the bitmap objects, and to further refine the output of the machine learning system to depict a bitmap object that indicates a healthy or faulty component depending on the data. In an example embodiment, the method creates a catalog of component images, and matches the images to a malfunction type and a bitmap object in the bitmap image. In an example embodiment, with each new release of a software or hardware components of a storage system, the machine learning system is retrained by adding all the newly reported malfunctions that were recorded since the previous release of such components.

In an example embodiment, the machine learning system detects a malfunction attributed to at least one component of the plurality of components depicted in the bitmap image by analyzing the bitmap image. In an example embodiment, the method detects a change between the bitmap image and a second bitmap image created from a different set of data (for example, a bitmap image created at an earlier point in time). In an example embodiment, the detected malfunctions are learned by the machine learning system as the machine learning system trains on a collection of bitmap images. In an example embodiment, the machine learning system learns to detect different malfunctions of different hardware and software components of a bitmap image using many hidden layers with each hidden layer increasing the complexity of the learned bitmap image features. For example, a first hidden layer detects a shape of a bitmap object. A second hidden layer detects different shades of a particular color, where the different shades each indicates a different faulty notification. Another hidden layer, for example, detects more critical malfunctions by detecting blocks made of multiple pixels. Yet another hidden layer detects more complex interactions between log objects, and/or detect complex related errors found in customer support historical data from reported malfunctions. In an example embodiment, the machine learning system identifies in the logs and statistics day and time of the log, system name, storage processor from which a log message was received, component from which a log message was received, user application and server running IO from which the storage process message was received, severity of the log message, source of health error/type of log (for example, "System", "Audit", "User", etc.), sub-component from which the log message was received, etc. In another example embodiment, the method trains the machine learning system to detect at least one of a bitmap object shape, a bitmap object edge, a plurality of pixels, a color associated with at least one pixel in the bitmap image, and at least one interaction between the plurality of components in the storage system.

In an example embodiment, the method modifies a representation of at least one component of the plurality of components in a graphical user interface to indicate the detected malfunction. For example, when a disk failure occurs, the method changes a pixel in the bitmap image to a different color, for example, "red", to indicate a component failure. In an example embodiment, the RAID that comprises the faulty disk also turns a different color, for example, "amber", when more than two disks malfunction. In another example embodiment, the RAID that comprises the faulty disk will turn a different color, for example, "red", when a second disk fails during a rebuild of a disk. Thus, the customer support engineers can quickly identify from the bitmap image, a faulty component when the fault is detected by the machine learning system; a picture is worth a thousand words.

In an example embodiment, when the method creates the bitmap image based on the gathered data further, the method depicts each component of the plurality of components as a bitmap object in the bitmap image. Each bitmap object has a different shape and is associated with a different sized pixel based on an importance associated with the each component in the storage system. In an example embodiment, IO ports of each storage processor may be depicted as one size of pixels, but the management and communication ports that may create data loss if a storage processor fails are depicted with pixels larger than the pixel size used for the IO ports.

In an example embodiment, the method trains the machine learning system to analyze the bitmap image to detect the difference between occurrence of malfunctions in the storage system and/or normal functioning of the storage system. In an example embodiment, during the training of the machine learning system, each bitmap object represents a different area of the hardware and/or software components to make it easier and faster to detect when the bitmap object changes color and/or shape. FIG. 5 illustrates bitmap objects of a healthy storage system, while FIG. 6 illustrates bitmap objects of an unhealthy storage system, where the components in the storage system that have malfunctioned are depicted as red identifiers within those components. The depictions in FIG. 5 and FIG. 6, also facilitate identifying different components, for example, the disks versus the memory banks. These depictions make it easy for a customer service engineer to quickly identify a malfunction, quickly identify the location of the malfunction, and/or the severity of the malfunction.

There are several advantages to embodiments disclosed herein. The method provides a visual representation of the components in a storage system along with an indication of the health status associated with each component, identifying malfunctions within components, identifying the location of the malfunctions, and identifying a severity associated with the malfunction. The method discerns between changes in an application workload versus a hardware and/or software malfunction. The method drastically reduces the time required to detect and resolve malfunctions that occur in a storage system. The method incorporates previously detected malfunctions into machine learning system in order to identify such malfunctions efficiently in new releases of hardware or software components of a storage system, facilitating sharing acquired knowledge among customer service engineers. The method eliminates the need to interpret logs to identify malfunctions.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of analyzing a storage system using a machine learning system, the method comprising:
    analyzing data gathered from information associated with operations performed in a storage system, wherein the storage system is comprised of a plurality of components;
    mapping text messages from event logs into a bitmap image, wherein the gathered data comprises the text messages;
    creating the bitmap image based on the gathered data, wherein at least one of the plurality of components is represented in the bitmap image; and
    training the machine learning system using the bitmap image, wherein the bitmap image is organized to depict the plurality of components of the storage system, wherein the machine learning system is trained to detect malfunctions of hardware and software components represented by a bitmap image using a plurality of hidden layers, wherein the plurality of components of the storage system comprises the hardware and software components and wherein the detected malfunctions are mapped to bitmap pixels in the bitmap image.

2. The method of claim 1, further comprising:
    detecting, by the machine learning system, a malfunction attributed to at least one component of the plurality of components depicted in the bitmap image by analyzing the bitmap image.

3. The method of claim 2, further comprising:
    detecting a change between the bitmap image and a second bitmap image created from a different set of data.

4. The method of claim 2, further comprising:
    modifying a representation of the at least one component of the plurality of components in a graphical user interface to indicate the detected malfunction.

5. The method of claim 1, wherein the information associated with the operations performed in the storage system includes at least one of event logs and statistics gathered from the plurality of components of the storage system upon detection of a malfunction in at least one component of the plurality of components.

6. The method of claim 1, wherein the data gathered from information associated with operations performed in the storage system is gathered by using a cloud based management application.

7. The method of claim 1, wherein creating the bitmap image based on the gathered data further comprises:
    depicting each component of the plurality of components as a bitmap object in the bitmap image, wherein each bitmap object has a different shape and is associated with a different sized pixel based on an importance associated with the each component in the storage system.

8. The method of claim 1, wherein training the machine learning system using the bitmap image comprises:
    training the machine learning system to detect at least one of:
    i) an object shape;
    ii) an object edge;
    iii) a plurality of pixels;
    iv) a color associated with at least one pixel in the bitmap image; and
    v) at least one interaction between the plurality of components in the storage system.

9. The method of claim 1, wherein training the machine learning system using the bitmap image comprises:
    training the machine learning system to analyze the bitmap image to detect the difference between occurrence of at least one of malfunctions in the storage system and normal functioning of the storage system.

10. A system for use in analyzing a storage system using a machine learning system, the system comprising a processor configured to:
    analyze data gathered from information associated with operations performed in a storage system, wherein the storage system is comprised of a plurality of components;
    map text messages from event logs into a bitmap image, wherein the gathered data comprises the text messages;
    create the bitmap image based on the gathered data, wherein at least one of the plurality of components is represented in the bitmap image; and
    train the machine learning system using the bitmap image, wherein the bitmap image is organized to depict the plurality of components of the storage system, wherein the machine learning system is trained to detect malfunctions of hardware and software components represented by a bitmap image using a plurality of hidden layers, wherein the plurality of components of the storage system comprises the hardware and software components and wherein the detected malfunctions are mapped to bitmap pixels in the bitmap image.

11. The system of claim 10, further configured to:
    detect, by the machine learning system, a malfunction attributed to at least one component of the plurality of components depicted in the bitmap image by analyzing the bitmap image.

12. The system of claim 11, further configured to:
    detect a change between the bitmap image and a second bitmap image created from a different set of data.

13. The system of claim 11, further configured to:
    modify a representation of the at least one component of the plurality of components in a graphical user interface to indicate the detected malfunction.

14. The system of claim 10, wherein the information associated with the operations performed in the storage system includes at least one of event logs and statistics gathered from the plurality of components of the storage system upon detection of a malfunction in at least one component of the plurality of components.

15. The system of claim 10, wherein the data gathered from information associated with operations performed in the storage system is gathered by using a cloud based management application.

16. The system of claim 10, wherein the processor configured to create the bitmap image based on the gathered data further is further configured to:
depict each component of the plurality of components as a bitmap object in the bitmap image, wherein each bitmap object has a different shape and is associated with a different sized pixel based on an importance associated with the each component in the storage system.

17. The system of claim 10, wherein the processor configured to train the machine learning system using the bitmap image is further configured to:
train the machine learning system to detect at least one of:
i) an object shape;
ii) an object edge;
iii) a plurality of pixels;
iv) a color associated with at least one pixel in the bitmap image; and
v) at least one interaction between the plurality of components in the storage system.

18. The system of claim 10, wherein the processor configured to train the machine learning system using the bitmap image is further configured to:
train the machine learning system to analyze the bitmap image to detect the difference between occurrence of at least one of malfunctions in the storage system and normal functioning of the storage system.

19. A computer program product for analyzing a storage system using a machine learning system, the computer program product comprising:
a computer readable storage medium having computer executable program code embodied therewith, the program code executable by a computer processor to:
analyze data gathered from information associated with operations performed in a storage system, wherein the storage system is comprised of a plurality of components;
map text messages from event logs into a bitmap image, wherein the gathered data comprises the text messages;
create the bitmap image based on the gathered data, wherein at least one of the plurality of components is represented in the bitmap image; and
train the machine learning system using the bitmap image, wherein the bitmap image is organized to depict the plurality of components of the storage system, wherein the machine learning system is trained to detect malfunctions of hardware and software components represented by a bitmap image using a plurality of hidden layers, wherein the plurality of components of the storage system comprises the hardware and software components and wherein the detected malfunctions are mapped to bitmap pixels in the bitmap image.

20. A method of analyzing a storage system using a machine learning system, the method comprising:
analyzing data gathered from information associated with operations performed in a storage system, wherein the storage system is comprised of a plurality of components, wherein the data is gathered from a cloud based management application;
mapping text messages from event logs into a bitmap image, wherein the gathered data comprises the text messages;
creating the bitmap image based on the gathered data, wherein at least one of the plurality of components is represented in the bitmap image; and
training the machine learning system to analyze, in a cloud based environment, the bitmap image to detect the difference between occurrence of at least one of malfunctions in the storage system and normal functioning of the storage system, wherein the machine learning system is trained to detect malfunctions of hardware and software components represented by a bitmap image using a plurality of hidden layers, wherein the plurality of components of the storage system comprises the hardware and software components and wherein the detected malfunctions are mapped to bitmap pixels in the bitmap image.

* * * * *